US009160621B2

(12) United States Patent
Kaneko

(10) Patent No.: US 9,160,621 B2
(45) Date of Patent: Oct. 13, 2015

(54) NETWORK SYSTEM, SERVER, INFORMATION PROCESSING APPARATUS, LOG REGISTRATION METHOD, AND PROGRAM

(75) Inventor: Shuhei Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 637 days.

(21) Appl. No.: 13/288,853

(22) Filed: Nov. 3, 2011

(65) Prior Publication Data

US 2012/0120441 A1    May 17, 2012

(30) Foreign Application Priority Data

Nov. 11, 2010   (JP) ................................ 2010-252413

(51) Int. Cl.
*G06F 15/00* (2006.01)
*H04L 12/24* (2006.01)
*G06F 3/12* (2006.01)

(52) U.S. Cl.
CPC ............ *H04L 41/069* (2013.01); *G06F 3/1203* (2013.01); *G06F 3/1218* (2013.01); *G06F 3/1273* (2013.01); *G06F 3/1287* (2013.01); *H04L 41/046* (2013.01)

(58) Field of Classification Search
CPC ............................. G06F 3/1273; G06F 3/1288
USPC ........................................................ 358/1.15
See application file for complete search history.

(56) References Cited

U.S. PATENT DOCUMENTS

| 8,458,727 B2* | 6/2013 | Palmer et al. ................. 719/318 |
| 2005/0278584 A1* | 12/2005 | Asami et al. .................... 714/45 |
| 2008/0065733 A1* | 3/2008 | Umetsu ......................... 709/206 |
| 2009/0180141 A1* | 7/2009 | Takaishi et al. .............. 358/1.15 |

FOREIGN PATENT DOCUMENTS

| JP | H08-328970 A | 12/1996 |
| JP | 2007-166176 A | 6/2007 |

OTHER PUBLICATIONS

Machine translation of Japanese Patent Document No. 08-328970, Takeshita, Dec. 13, 1996.*

* cited by examiner

*Primary Examiner* — Chuong A Ngo
*Assistant Examiner* — Mark Milia
(74) *Attorney, Agent, or Firm* — Canon USA, Inc. IP Division

(57) ABSTRACT

A network system may include a server and a client. The server accepts a request for a reservation of registration of a log that is transmitted from the client, and returns to the client log registration identification information. The server acquires execution command data from a registration command storage and registers the log stored in a log storing storage with a storage unit, asynchronously with the registration of the execution command data with a registration command storage. The client stores a log, transmits a request for a reservation of registration of the stored log, and selects a log to be requested to be registered from the stored log based on returned log identification information. The client transmits the selected log to the server to request registration of the log.

9 Claims, 16 Drawing Sheets

FIG.6

| CLIENT ID | SEND ID | LOG ID | CONTENT OF JOB LOG |
|---|---|---|---|
| CANXN | 00-00-00-00-00-00_20101010_1 | 621 | ....... |
| CANXN | 99-99-99-99-99-99_20101010_1 | 622 | ....... |
| ⋮ | ⋮ | ⋮ | ⋮ |

FIG.7

JOB LOG ~701

| CLIENT ID | SEND ID | LOG ID | CONTENT OF JOB LOG |
|---|---|---|---|
| CANXN | 00-00-00-00-00-00_20101010_1 | 621 | ······· |
| CANXN | 99-99-99-99-99-99_20101010_1 | 622 | ······· |
| ⋮ | ⋮ | ⋮ | ⋮ |

COMPRESSED DATA TEMPORARY STORAGE UNIT ~702

| CLIENT ID | SEND ID | COMPRESSED DATA |
|---|---|---|
| CANXN | 00-00-00-00-00-00_20101010_1 | DATA |
| CANXN | 99-99-99-99-99-99_20101010_1 | DATA |
| ⋮ | ⋮ | ⋮ |

REGISTRATION INFORMATION STORAGE UNIT ~703

| CLIENT ID | SEND ID | LOG ID | STATE |
|---|---|---|---|
| CANXN | 00-00-00-00-00-00_20101010_1 | 621 | TRUE |
| CANXN | 99-99-99-99-99-99_20101010_1 | 622 | ENTRY |
| ⋮ | ⋮ | ⋮ | ⋮ |

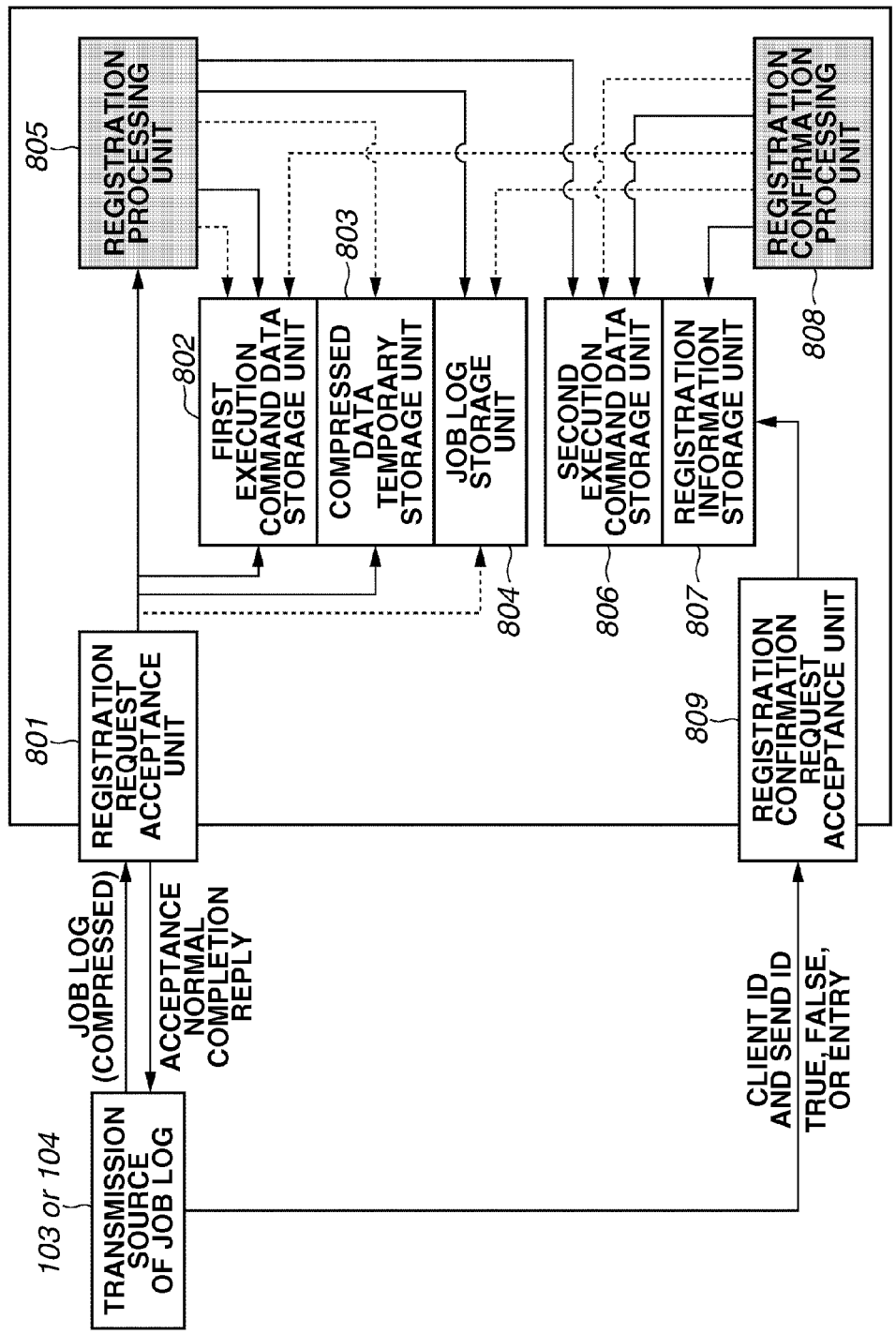

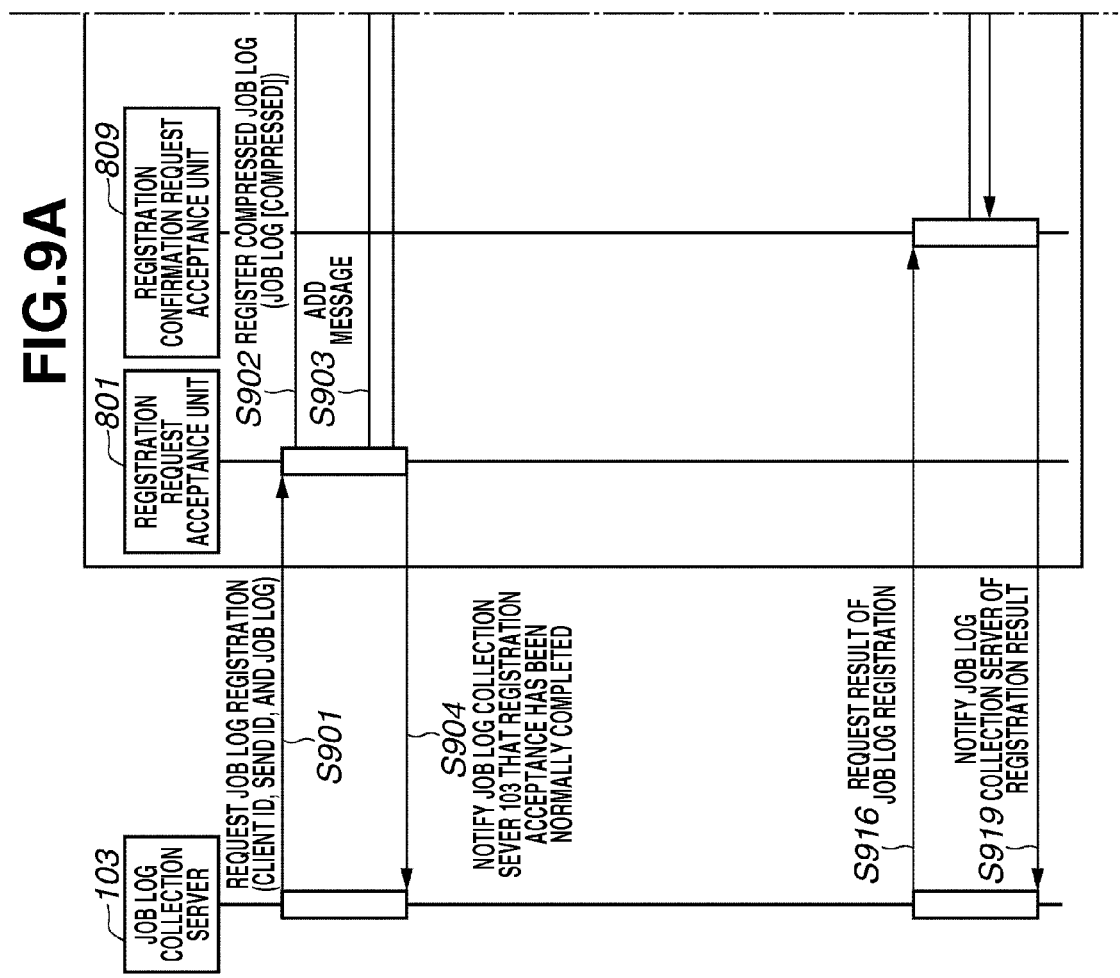

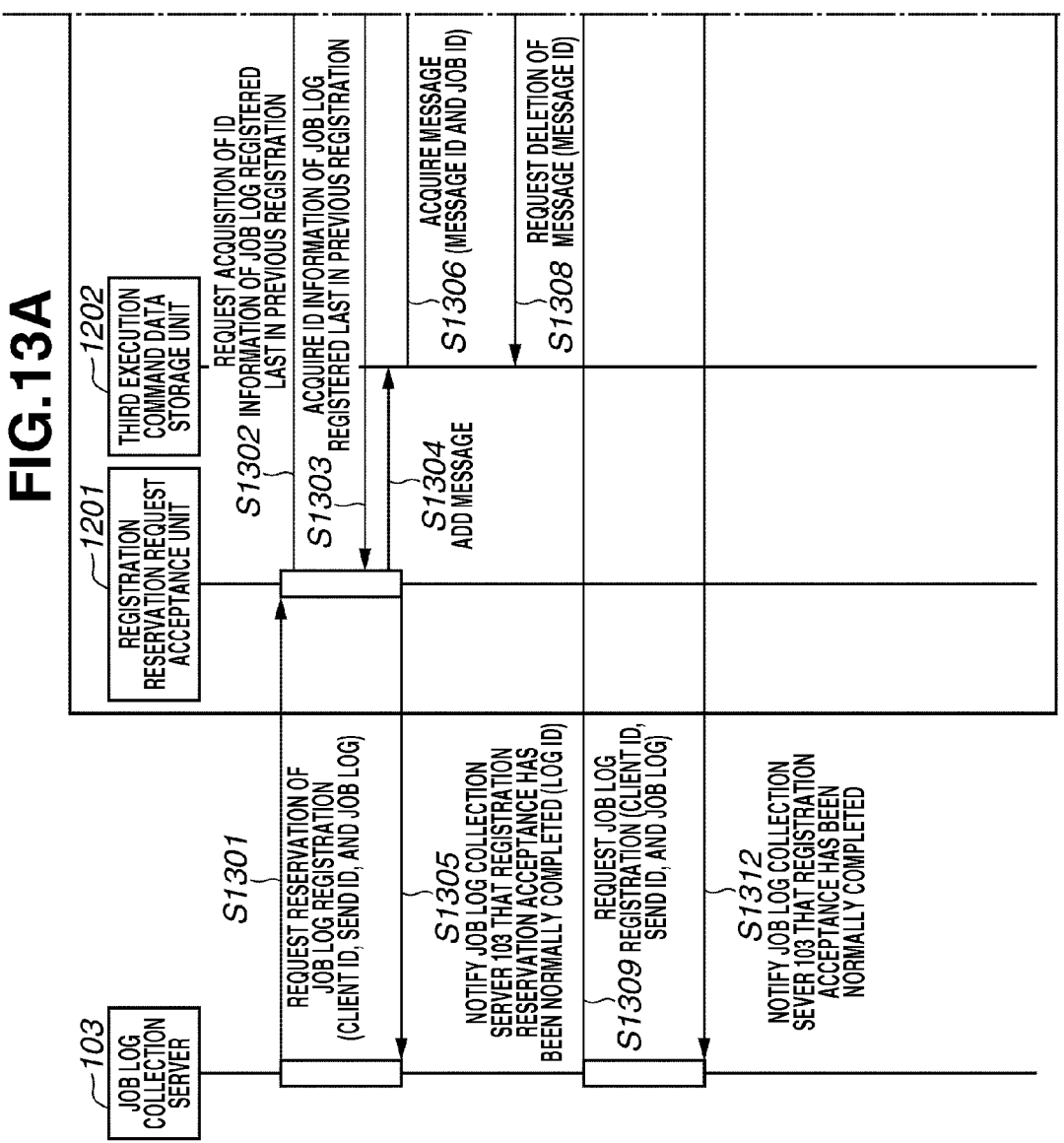

NETWORK SYSTEM, SERVER, INFORMATION PROCESSING APPARATUS, LOG REGISTRATION METHOD, AND PROGRAM

BACKGROUND OF THE INVENTION

1. Field of the Invention

The present invention relates to control for registering a log of an image forming apparatus on the Internet.

2. Description of the Related Art

Conventionally, there has been developed a job management method for efficiently managing a job history (job log) performed in an image forming apparatus such as a printer, a scanner, a facsimile, a copying machine, and a multifunction printer (MFP) integrating these machines. One method for collecting a job log is to install an application enabling transmission of a job log in an image forming apparatus, and cause the image forming apparatus itself to transmit the job log, as discussed in, for example, Japanese Patent Application Laid-Open No. 2007-166176.

Another method for collecting a job log is to cause, for example, a server computer in a network to acquire a job log of each job performed in various image forming apparatuses from the image forming apparatuses.

According to conventional methods, job log registration is performed in such a state that an image forming apparatus side, which transmits a job log, and a server side, which registers the job log, maintain communication therebetween (in synchronization with each other) when the job log is registered. In recent years, the cloud computing system technique and the Software as a Service (SaaS) technique have started to be used as a system configuration in which a server computer side is in charge of various kinds of processing.

The cloud computing technique utilizes many computing resources to distribute data processing among them, so that a large number of requests can be processed simultaneously. Hereinafter, the term "instance" will be used to collectively refer to an entity of one processing which offers a function with use of computing resources.

Consider such a configuration that a job log is registered from, for example, a jog log collection server which collects a job log from an image forming apparatus, or an image forming apparatus to a server computer group which constitutes a cloud. Hereinafter, the term "client" will be used to collectively refer to a job log collection server and an image forming apparatus which register a job log to a server computer group.

If a client and a server computer group are in synchronization with each other to register a job log, like the conventional job log registration methods, an instance is occupied from the start to the end of the registration processing. In addition, conventional job log registration is performed within an intranet, and therefore a system side can know the number of clients. As a result, less stressful job log registration is realized by setting up the schedule of jog log registration timing.

However, once job log registration has been started to be performed in an Internet environment, it has become impossible for a system side to know when and how much access is coming from clients. Therefore, this system may have such a situation that the server computer side receives registration requests from a large number of clients at the same time. The cloud computing technique utilizes many instances and can process requests from a large number of clients at the same time by distributing data processing.

However, realization of a job log collection system under the cloud computing technique requires many instances to maintain running for a long time so that the server computer side can maintain a stable operation even when a plurality of clients tries access thereto at the same time. The cloud computing technique is characterized by its ability to freely use many resources by freely setting the number of instances, but this leads to such an issue that a user is charged according to how many hours the instances are running, and an increase in the number of instances results in an increase in the operational cost.

SUMMARY OF THE INVENTION

The present invention is directed to a mechanism capable of reducing an operational cost for log registration by reducing a total operating time of instances in cloud computing.

According to an aspect of the present invention, a network system includes: a server provided with a storage unit and constituted of a server computer group including one or more server computers communicable to a client, wherein the server includes: one or a plurality of first acceptance units configured to accept a request for a reservation of registration of a log that is transmitted from the client, and return, to the client, identification information of a log registered last from the client with the storage unit, one or a plurality of second acceptance units configured to accept a request for registration of a log that is transmitted from the client, temporarily store the log in a log storing storage, and register execution command data for processing the request for the registration with a registration command storage, and one or a plurality of registration processing units configured to acquire the execution command data from the registration command storage and register the log stored in the log storing storage with the storage unit, asynchronously with the registration of the execution command data with the registration command storage; and the client, wherein the client includes: a storing unit configured to store a log, a first transmission unit configured to transmit, to the first acceptance unit, a request for a reservation of registration of the log stored in the storing unit, a selection unit configured to select a log to be requested to be registered from the log stored in the storing unit based on log identification information returned in response to the transmission of the request for the reservation of the registration, and a second transmission unit configured to transmit the log selected by the selection unit to the second acceptance unit to request registration of the log.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a job log according to the present exemplary embodiment.

FIG. 7 illustrates data stored in the server computer group according to the present exemplary embodiment.

FIG. 8 illustrates a configuration of interfaces that are implemented in a service according to a first exemplary embodiment.

DESCRIPTION OF THE EMBODIMENTS

Various exemplary embodiments, features, and aspects of the invention will be described in detail below with reference to the drawings.

Figure 1:
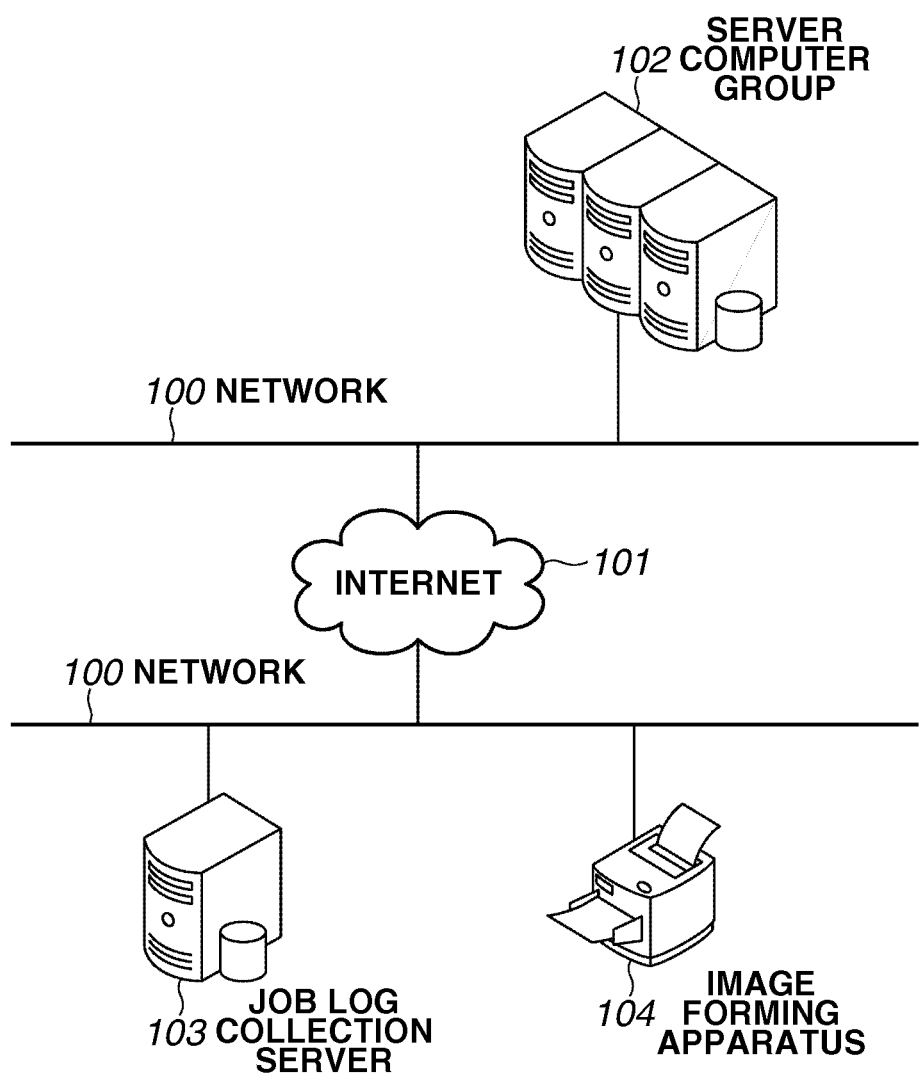
FIG. 1 illustrates an example of a configuration of a log registration system according to an exemplary embodiment of the network system.

A configuration of a log registration system according to an exemplary embodiment of a network system will be described in detail with reference to FIG. 1. FIG. 1 illustrates an example of a configuration of the log registration system according to the exemplary embodiment of the network system. As illustrated in FIG. 1, in the log registration system according to the present exemplary embodiment, apparatuses constituting the network system are connected to one another via networks 100 and the Internet 101. The apparatuses constituting the network system include, for example, a server computer group 102, a job log collection server 103, and an image forming apparatus 104.

The network 100 is a communication line for enabling exchanges of information between the above-described apparatuses. The Internet 101 is a communication line for enabling exchanges of information between the above-described apparatuses over a firewall. Communication can be established over the firewall via the Internet 101 between the network 100 including the job log collection server 103 and the image forming apparatus 104, and the network 100 including, for example, the server computer group 102. The network 100 and the Internet 101 are communication line networks based on, for example, the Transmission Control Protocol/Internet Protocol (TCP/IP) protocol, and may be wired or wireless.

The server computer group 102 is constituted by one or more server computers. In the following, apparatuses which transmit a job log to the server computer group 102, such as the job log collection server 103 and the image forming apparatus 104, will be collectively referred to as "client".

Exemplary embodiments will be described based on an example of registering a job log (job history) in the log registration system as an exemplary embodiment of the network system. However, a log to be registered in the network system is not limited to a job log, and may be any kind of log of the image forming apparatus 104 or any kind of log that the collection server 103 can collect.

In the following, internal configurations of the respective apparatuses constituting the network system illustrated in FIG. 1 will be described in detail. First, the internal configuration of each server computer constituting the server computer group 102, and the job log collection server 103 will be described with reference to FIG. 2.

Figure 2:
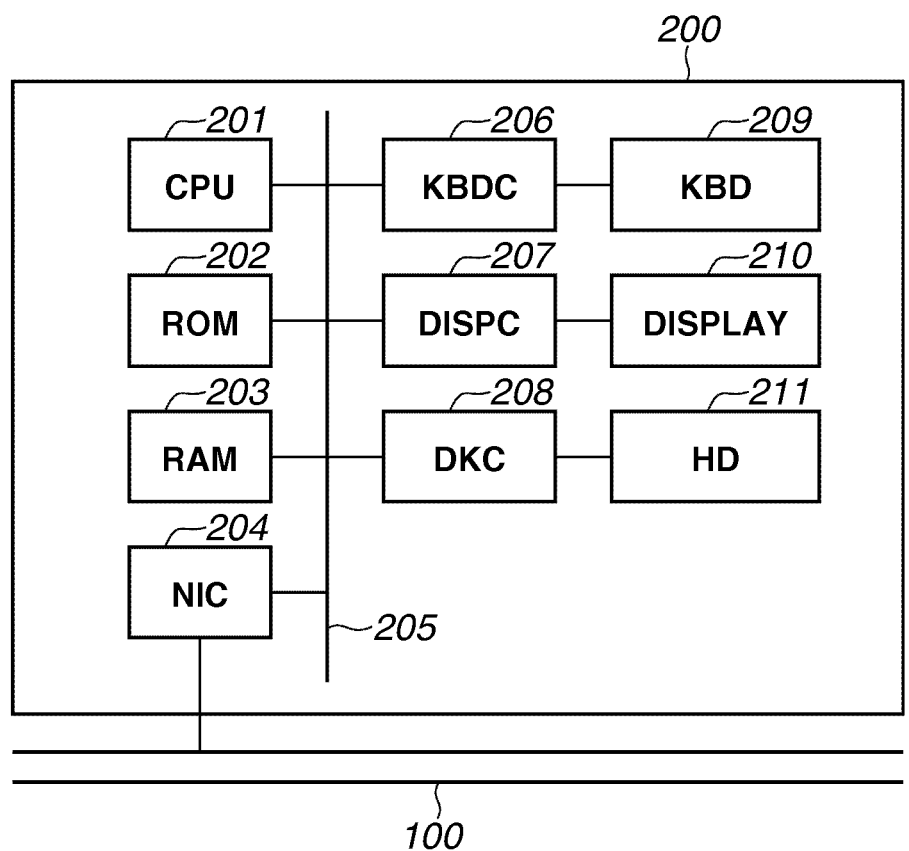
FIG. 2 is a block diagram illustrating an example of an internal configuration of an information processing apparatus functioning as each server computer constituting a server computer group or a job log collection server.

FIG. 2 is a block diagram illustrating an example of an internal configuration of an information processing apparatus functioning as each server computer constituting the server computer group 102, and the job log collection server 103. Referring to FIG. 2, a computer as a whole (personal computer (PC)) 200 includes a central processing unit (CPU) 201. The CPU 201 executes software (program) stored in a read only memory (ROM) 202 or a mass storage device (for example, a hard disk (HD) 211), and provides overall control of the respective units connected to a system bus 205. The mass storage device may be embodied by a medium that is not an HD (for example, a flash memory).

A random access memory (RAM) 203 serves as, for example, a main memory and a work area of the CPU 201. A network interface card (NIC) 204 bi-directionally transmits data between the PC 200 and another node via the network 100.

A keyboard controller (KBDC) 206 controls an instruction input from a keyboard (KBD) 209 and a not-illustrated pointing device provided to the PC 200. A display controller (DISPC) 207 controls a display of a display module (DISPLAY) 210 constituted by, for example, a liquid crystal display. A disk controller (DKC) 208 controls the hard disk (HD) 211 as a mass storage image forming apparatus.

Figure 3:
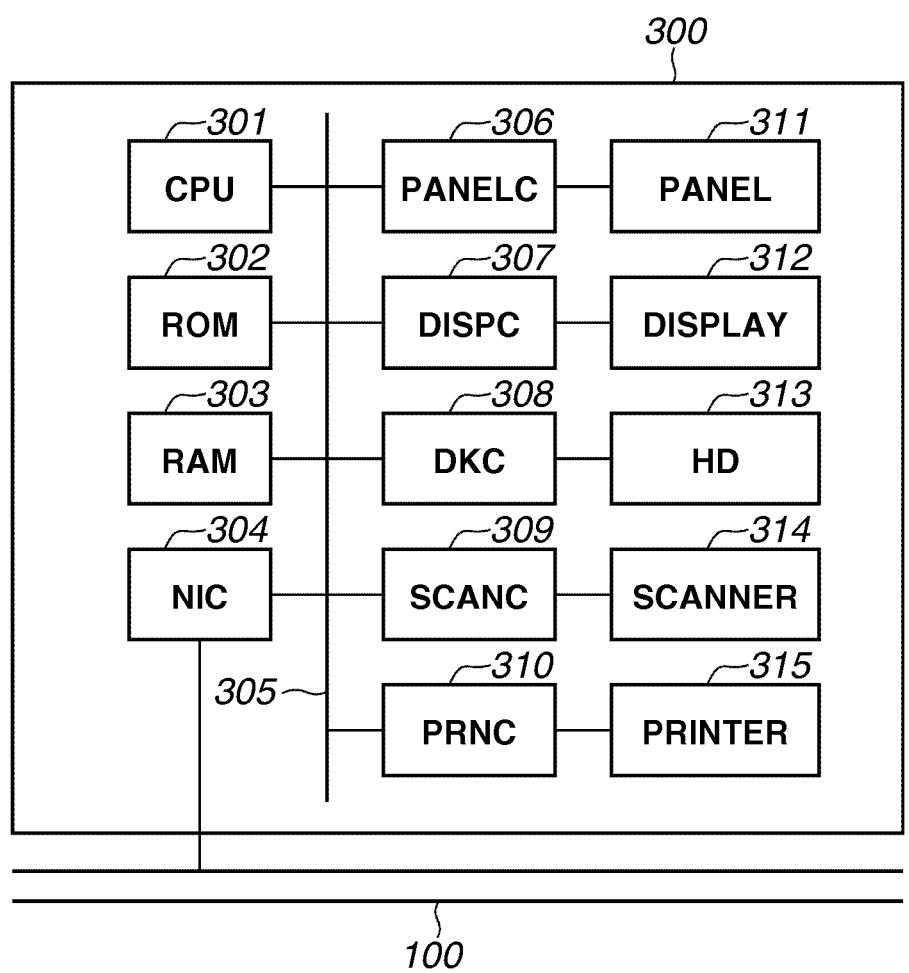
FIG. 3 is a block diagram illustrating an example of an internal configuration of an image forming apparatus.

Next, an internal configuration of the image forming apparatus 104 will be described with reference to FIG. 3. FIG. 3 is a block diagram illustrating an example of the internal configuration of the image forming apparatus 104. Referring to FIG. 3, an image forming apparatus 300 represents the image forming apparatus 104 as a whole. The image forming apparatus 300 includes a CPU 301. The CPU 301 executes software (program) stored in a ROM 302 or a mass storage device (for example, a hard disk (HD) 313), and provides overall control of the respective units connected to a system bus 305. The mass storage device may be embodied by a medium that is not an HD (for example, a flash memory).

A RAM 303 serves as, for example, a main memory and a work area of the CPU 301. A network interface card (NIC) 304 exchanges data between the image forming apparatus 300 and another node via the network 100.

A panel controller (PANELC) 306 controls an instruction input from an operation panel (PANEL) 311 provided to the image forming apparatus 300. A display controller (DISPC) 307 controls a display of a display module (DISPLAY) 312 constituted by, for example, a liquid crystal display. A disk controller (DKC) 308 controls the hard disk (HD) 313 as a mass storage image forming apparatus.

A scanner controller (SCANC) 309 controls an optical scanner apparatus (scanner) 314 provided to the image forming apparatus 300, and reads a paper document. A printer controller (PRNC) 310 controls a printer apparatus (printer) 315 provided to the image forming apparatus 300, and prints data on an actual sheet by using a known printing technique such as the electrophotographic technique or the inkjet technique.

The internal configuration of the image forming apparatus 104 may be the configuration of the image forming apparatus 300 illustrated in FIG. 3 from which the scanner controller 309 and the optical scanner apparatus 314 are removed. Further, the internal configuration of the image forming apparatus 104 may be the configuration of the image forming apparatus 300 illustrated in FIG. 3 from which, for example, the panel controller (PANELC) 306, the operation panel 311, the display controller (DISPC) 307, and/or the display module (DISPLAY) 312 are removed.

Figure 4:
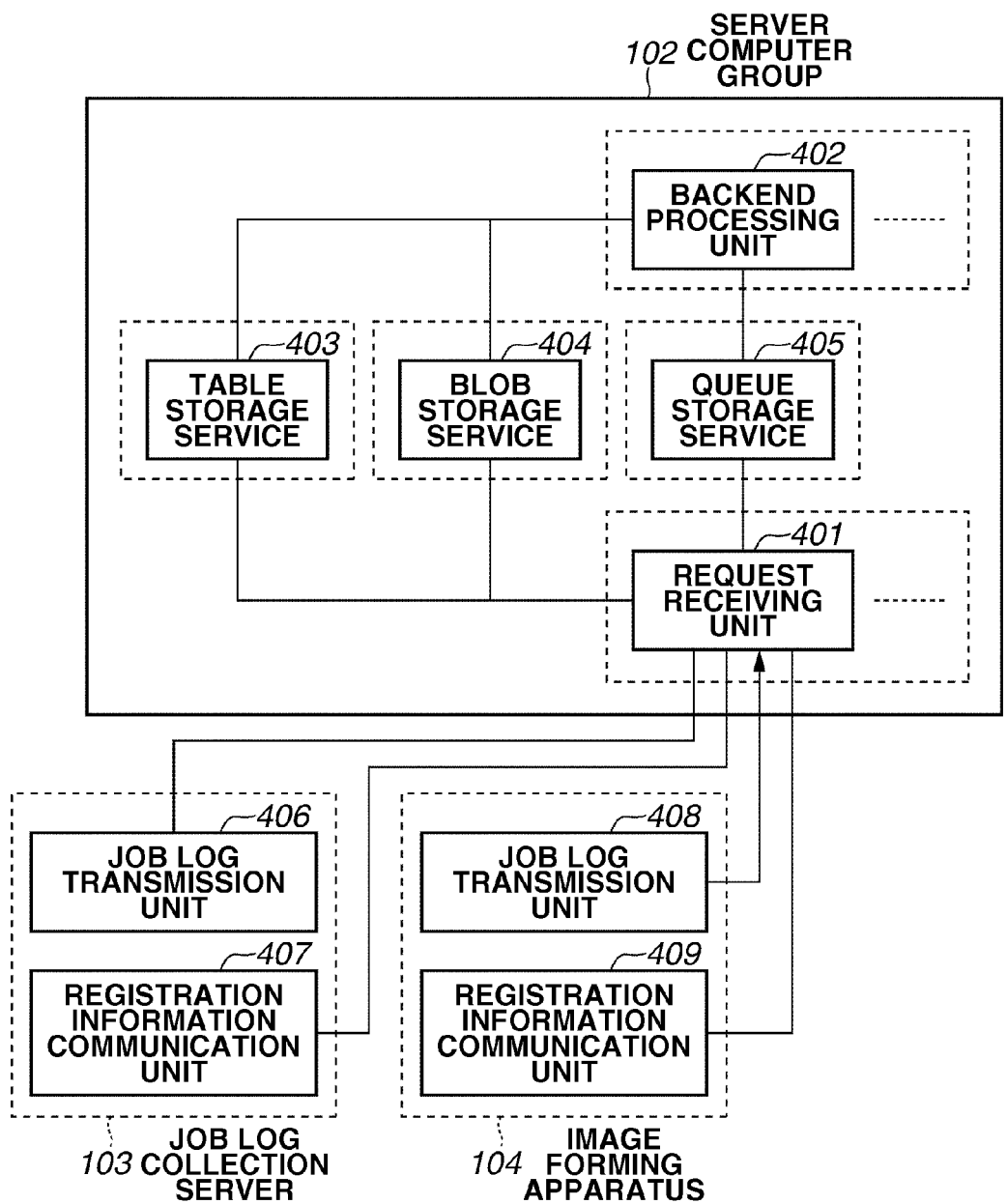
FIG. 4 is a block diagram illustrating functions of each apparatus in the job log registration system according to the present exemplary embodiment.

In the following, the functions of the respective apparatuses in the job log registration system according to the present exemplary embodiment will be described in detail with reference to FIG. 4. FIG. 4 is a block diagram illustrating the functions of the respective apparatuses in the job log registration system according to the present exemplary embodiment. First, the functions of the server computer group 102 will be described. The server computer group 102 has the functions of a request receiving unit 401, a backend processing unit 402, a table storage service 403, a blob storage service 404, and a queue storage service 405.

The present exemplary embodiment includes at least one or more server computers including the request receiving unit 401. Further, the present exemplary embodiment includes at least one or more server computers including the backend processing unit 402. Further, the present exemplary embodiment includes at least one or more server computers including the respective functions of the table storage service 403, the bob storage service 404, and the queue storage service 405.

The request receiving unit 401 has a function of receiving a processing request transmitted from the job log collection server 103 or the image processing apparatus 104. The backend processing unit 402 has a function of performing processing corresponding to the processing request with use of a processing program. More specifically, the backend processing unit 402 loads the processing program to the memory of the server computer executing the backend processing unit 402, and then performs the processing corresponding to the processing request.

A request receiving program, which is stored in the ROM 202 or the HD 211 of the information processing apparatus (FIG. 2) constituting the server computer group 102, is loaded to the RAM 203 and is executed by the CPU 201, thereby realizing the request receiving unit 401. Further, a backend processing program, which is stored in the ROM 202 or the HD 211 of the information processing apparatus (FIG. 2) constituting the server computer group 102, is loaded to the RAM 203 and is executed by the CPU 201, thereby realizing the backend processing unit 402.

The server computer group 102 may include a plurality of request receiving units 401 and a plurality of backend processing units 402, instead of including only one request receiving unit 401 and one backend processing unit 402. The request receiving unit 401 corresponds to a registration request acceptance unit 801, a registration confirmation request acceptance unit 809, and a registration reservation request acceptance unit 1201 illustrated in FIGS. 8 and 12 which will be described below. The backend processing unit 402 corresponds to a registration processing unit 805, a registration confirmation processing unit 808, and a registration instance generation unit 1203 illustrated in FIGS. 8 and 12 which will be described below.

The table storage service 403 has a function of storing a job log. Job log registration is performed by registration processing of the backend processing unit 402. A table storage service program, which is stored in the ROM 202 or the HD 211 of the information processing apparatus (FIG. 2) constituting the server computer group 102, is loaded to the RAM 203 and is executed by the CPU 201, thereby realizing the table storage service 403. Further, a storage destination into which the table storage service 403 stores data is the ROM 202 or the HD 211. The table storage service 403 corresponds to a job log storage unit 804 and a registration information storage unit 807 illustrated in FIGS. 8 and 12 which will be described below.

The blob storage service 404 has a function of temporarily storing a job log received from a client through the request receiving unit 401. A blob storage service program, which is stored in the ROM 202 or the HD 211 of the information processing apparatus (FIG. 2) constituting the server computer group 102, is loaded to the RAM 203 and is executed by the CPU 201, thereby realizing the blob storage service 404. Further, a storage destination into which the blob storage service 404 stores data is the ROM 202 or HD 211. The blob storage service 404 corresponds to a compressed data temporary storage unit 803 illustrated in FIGS. 8 and 12 which will be described below.

The queue storage service 405 has the following functions. First, the queue storage service 405 has a function of enabling asynchronous data communication between the request receiving unit 401 and the backend processing unit 402. Second, the queue storage service 405 has a function of making a queue message added to a queue invisible or visible.

The first function of the queue storage service 405 will be described. The request receiving unit 401 and the backend processing unit 402 communicate with each other in the following manner. First, upon receiving a processing request from a user, the request receiving unit 401 generates a ticket referred to as a queue message according to the processing request from the user. The queue message is stored in the queue by the request receiving unit 401. The backend processing unit 402 acquires the queue message from the queue. The backend processing unit 402 acquires the queue message, refers to the queue message, and then processes the processing request from the user. Accordingly, the processing request from the user is resolved. In this way, the use of the queue storage service 405 allows the request receiving unit 401 and the backend processing unit 402 to communicate with each other asynchronously. The further details of the first function, and the second function of the queue storage service 405 will be described below.

A queue storage service program, which is stored in the ROM 202 or the HD 211 of the information processing apparatus (FIG. 2) constituting the server computer group 102, is loaded to the RAM 203 and is executed by the CPU 201, thereby realizing the queue storage service 405. Further, a storage destination that the queue storage service 405 stores data is the ROM 202 or the HD 211. The queue storage service 405 corresponds to a first execution command data storage unit 802, a second execution command data storage unit 806, and a third execution command data storage unit 1202 illustrated in FIGS. 8 and 12 which will be described below.

Next, the job log collection server 103 will be described in detail. The job log collection server 103 has the functions of a job log transmission unit 406 and a registration information communication unit 407. The job log transmission unit 406 has a function of collecting a job log stored in a device connected via the network 100 to store it in a storage unit (not illustrated), and of transmitting it to the request receiving unit 401. The registration information communication unit 407 can receive information indicating until which number of job log could be registered in the previous registration. Further, the registration information communication unit 407 may be able to transmit information indicating until which number of job log has been transmitted in the previous processing.

A job log transmission program, which is stored in the ROM 202 or the HD 211 of the information processing apparatus (FIG. 2) constituting the job log collection server 103, is loaded to the RAM 203 and is executed by the CPU 201, thereby realizing the job log transmission unit 406. Further, a registration information communication program, which is stored in the ROM 202 or the HD 211 of the information processing apparatus (FIG. 2) constituting the job log collection server 103, is loaded to the RAM 203 and is executed by the CPU 201, thereby realizing the registration information communication unit 407.

Next, the image forming apparatus 104 will be described in detail. The image forming apparatus 104 has the functions of a job log transmission unit 408 and a registration information communication unit 409. The job log transmission unit 408 has a function of transmitting a job log stored in a storage unit (not illustrated) in the image forming apparatus 104 to the request receiving unit 401. The registration information communication unit 409 can receive information indicating until which number of job log could be registered in the previous registration. Further, the registration information communication unit 409 may be able to transmit information indicating until which number of job log has been transmitted in the previous processing.

A job log transmission program, which is stored in the ROM 302 or the HD 313 of the image forming apparatus (FIG. 3), is loaded to the RAM 303 and is executed by the CPU 301, thereby realizing the job log transmission unit 408. Further, a registration information communication program, which is stored in the ROM 302 or the HD 313 of the image forming apparatus (FIG. 3), is loaded to the RAM 303 and is executed by the CPU 301, thereby realizing the registration information communication unit 409.

Figure 5:
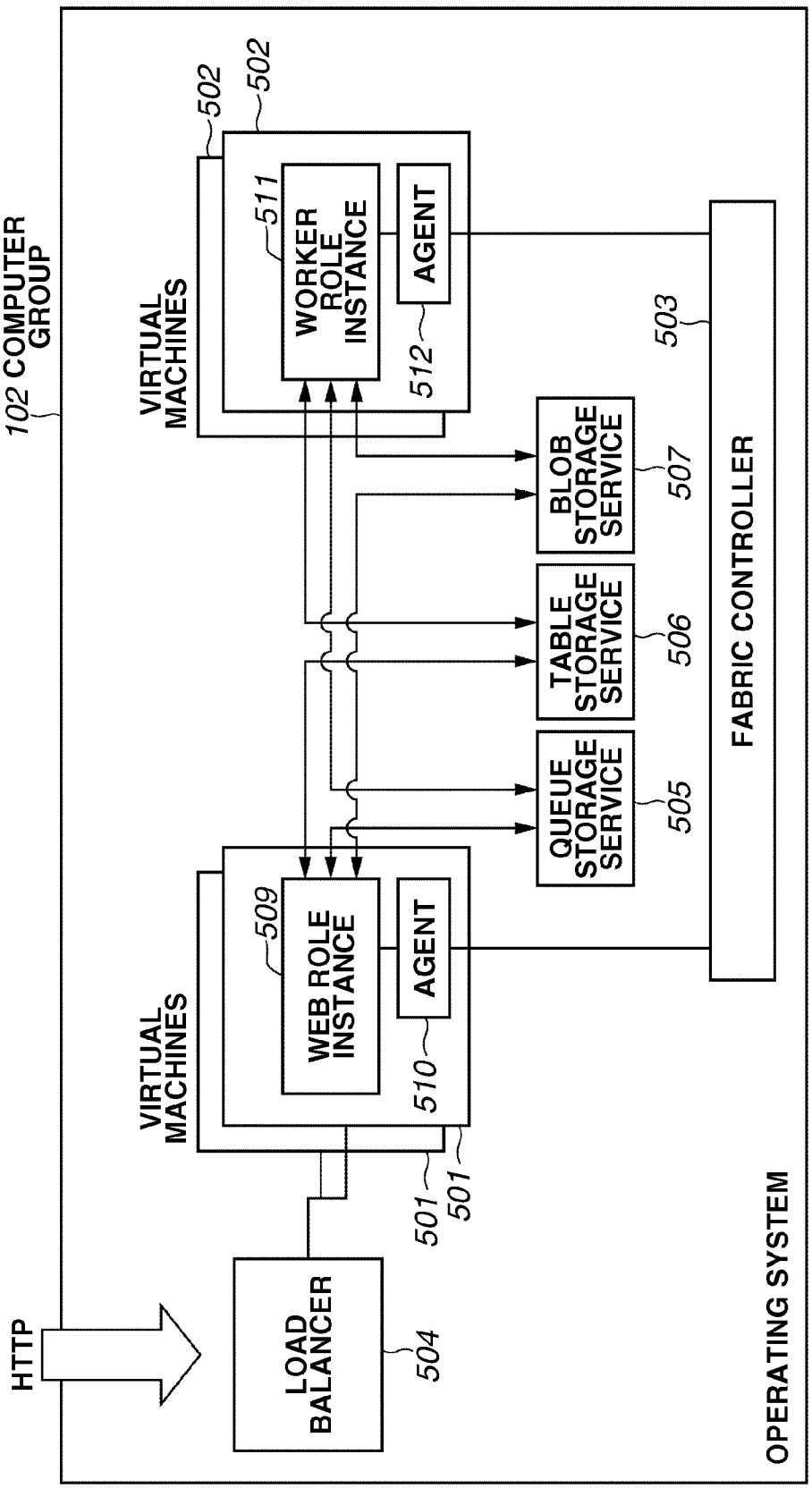
FIG. 5 illustrates various functions in the server computer group.

These are descriptions of the functions provided to the respective apparatuses in the job log registration system according to the present exemplary embodiment. Next, a platform system of the server computer group 102 will be described in detail with reference to FIG. 5. FIG. 5 illustrates various functions in the server computer group 102. Referring to FIG. 5, physical hardware resources that exist in the server computer group 102 are used as the platform of the server computer group 102. A user of the platform of the server computer group 102 can use these physical hardware resources that exist in the server computer group 102 as computing resources.

The platform system (operating system) of the server computer group 102 has the following functions (501 to 507), i.e., virtual machines 501 and 502, a fabric controller 503, a load balancer 504, a queue storage service (queue) 505, a table storage service (table) 506, and a blob storage service (blob) 507.

The plurality of virtual machines 501 and 502 is provided within the platform system which operates on the server computer group 102. The virtual machine is a logical computer into which the physical server computer group 102 is divided by the virtualization technique, and which operates under its independent operating system as the divided logical computer. The unit of this logical computer is counted as an "instance". In the present exemplary embodiment, one instance operates on one server computer in the server computer group 102.

The virtual machine 501 includes a request receiving unit (web role instance) 509, and a request receiving unit agent (agent) 510. The request receiving unit 509 corresponds to the request receiving unit 401 illustrated in FIG. 4. The request receiving unit 509 receives a processing request from a user via the load balancer 504 which will be described below. Further, the request receiving unit 509 transmits the processing request to a backend processing unit 511 via the queue storage service 505.

A request from an external network (communication with use of the hypertext transfer protocol (HTTP) protocol in this example) is transmitted via the load balancer 504, which exits outside the virtual machine 501, to ensure high availability of the request receiving unit 509. The load balancer 504 centrally manages requests from the external network, and selectively transmits the requests to a plurality of virtual machines having the function as a similar request receiving unit. The request receiving unit agent 510 collects various pieces of information including the use status of the virtual machine 501, the operating status of the request receiving unit 509, the resource use status of the virtual machine 501, and an error in the request receiving unit 509. The request receiving unit agent 510 regularly transmits the collected various pieces of information to the fabric controller 503.

The respective instances of the request receiving unit 509 and the backend processing unit 511 are managed by the fabric controller 503. Therefore, the expandability and the availability of each instance can be ensured. For example, consider a case where a certain instance is stopped in the request receiving unit 509 or the backend processing unit 511 due to a failure in the server. In this case, the fabric controller 503 cannot receive a regular notification from the request receiving unit agent 510 or a backend processing unit agent 512. The fabric controller 503, which cannot receive a regular notification, issues an instruction to a virtual machine so that the processing is delegated to a new instance. As a result, it is possible to maintain a constant number of instances performing processing, so that it can prevent delay in the processing.

The virtual machine 502 includes the backend processing unit (worker role instance) 511, and the backend processing unit agent (agent) 512. The backend processing unit 511 corresponds to the backend processing unit 402 illustrated in FIG. 4. The backend processing unit 511 receives a processing request from the request receiving unit 509 via the queue storage service 505. The backend processing unit 511 performs the processing according to the processing request received from the request receiving unit 509 via the queue storage service 505.

The backend processing unit 511 can be scaled out. The term "scale out" means that the number of the virtual machines 502 is increased, and the number of instances as the backend processing units 511 is increased. Increasing the number of instances as the backend processing units 511 reduces the data processing amount per backend processing unit. Accordingly, it becomes possible to more quickly return a result to a processing request transmitted from a user.

The queue storage service 505 provides a service for enabling asynchronous data communication between the request receiving unit 509 and the backend processing unit 511. The queue storage service 505 corresponds to the queue storage service 405 illustrated in FIG. 4. The request receiving unit 509 and the backend processing unit 511 have asynchronous data communication with each other by issuing various instructions to the queue storage service 505. This processing will be described more concretely. The instruction that the request receiving unit 509 issues to the queue storage service 505 is an instruction to add a queue message. The instruction that the backend processing unit 511 issues to the queue storage service 505 is an instruction to acquire a queue message or an instruction to delete a queue message.

A series of operations of the request receiving unit 509 and the backend processing unit 511 during asynchronous data communication will be described. The request receiving unit 509 generates a queue message according to a processing request from a user, and transmits an addition instruction to the queue storage service 505 so that the queue storage service 505 adds the queue message to the queue. Upon receiving the addition instruction, the queue storage service 505 adds the queue message to the queue.

The backend processing unit 511 issues an acquisition instruction to the queue storage service 505 to acquire the queue message. Upon receiving the acquisition instruction, the queue storage service 405 returns the queue message, a message identification (ID) uniquely assigned to each queue message, and a job ID as a response to the acquisition instruction to the backend processing unit 511. The message ID is unique information assigned to each queue message to uniquely identify the queue message, and is used when the backend processing unit 511 instructs deletion of the queue message after completion of the processing. The job ID is an ID to uniquely determine the content of processing to be actually performed.

The backend processing unit 511 instructs the queue storage service 505 to delete the queue message corresponding to the received ID after completion of the processing according to the processing request. Upon receiving the deletion instruction, the queue storage service 505 deletes the queue message corresponding to the received ID instructed by the backend processing unit 511 from the queue. This deletion can prevent such redundancy of processing that the same queue message is processed by a backend processing unit 511 other than the backend processing unit 511 that issues the deletion instruction.

The queue storage service 505 has the function of making a queue message added to the queue visible or invisible. Making a queue message visible means that, when the backend processing unit 511 requests acquisition of a queue message added to the queue, the queue storage service 505 transmits the queue message to the backend processing unit 511. Making a queue message invisible means that, when the backend processing unit 511 requests acquisition of a queue message added to the queue, the queue storage service 505 does not transmit the queue message to the backend processing unit 511.

After the backend processing unit 511 acquires a queue message from the queue, the acquired queue message is made invisible by the queue storage service 505. The queue message acquired by the backend processing unit 511 and made invisible is made visible by the queue storage service 505 when the processing result is not returned for a certain period from the backend processing unit 511 which performs the processing. Accordingly, the processing can be automatically tried again even when the backend processing unit 511 is abnormally ended and cannot continue the processing.

The table storage service 506 offers a storage for use in storing data. The table storage service 506 stores data in such a simple form that an entity and a type information property are combined. The table storage service 506 corresponds to the table storage service 403 illustrated in FIG. 4.

The blob storage service 507 offers a storage for use in storing data. The blob storage service 507 offers a function of storing a set of binary data. The blob storage service 507 corresponds to the blob storage service 404 illustrated in FIG. 4.

Next, a job log according to the present exemplary embodiment will be described with reference to FIG. 6. The job log means a job history performed by an image forming apparatus. The job history contains information indicating when and which apparatus performed what kind of job.

FIG. 6 illustrates an example of the job log according to the present exemplary embodiment. As illustrated in FIG. 6, the job log includes a client ID 601, a send ID 602, a log ID 603, and a job log content 604 (for example, the print date and time, the number of printouts, color/monochrome, the name of the printer, and the name of the user of the print job).

The client ID 601 is an ID for identifying a client that transmits a job log to the server (client identification information). Including the client ID 601 in the job log allows job logs to be centrally managed if a plurality of image forming apparatuses exists as clients.

The send ID 602 stores information indicating when and who transmits the job log. By setting the send ID 602 as a key, success or failure of job log registration can be checked for each job log collection server 103 or each device (image processing apparatus 104).

The log ID 603 is a value automatically assigned by the job log collection server 103 or the image forming apparatus 104 which is a transmission source, and is set automatically when a job occurs. This value uniquely determines a job at the client side which is a transmission source of the job log (job log identification information at the client side). The client side can understand which log ID 603 of the job log needs to be registered next by checking the log ID 603 of the previously-registered job logs.

In the present exemplary embodiment, the job log is transmitted from the client to the server computer group 102 in a compressed state. The compressed job log is decompressed in the server computer group 102, and then is registered with the table storage service 403 in the server computer group 102.

Next, a structure of information stored in the storage in the cloud will be described with reference to FIG. 7. FIG. 7 illustrates data stored in the server computer group 102 according to the present exemplary embodiment. The same elements are indicated by the same reference numerals as those in FIG. 6.

A job log storage unit 701 is a storage with which a job log that a client requests to register is registered. The job log illustrated in FIG. 6 is transmitted from the client in a compressed state, and is registered after being decompressed by the backend processing unit 402. The job log storage unit 701 corresponds to the job log storage unit 804 illustrated in FIGS. 8 and 12 which will be described below.

A compressed data temporary storage unit 702 is a storage for temporarily storing a compressed job log transmitted from a client. The compressed data temporary storage unit 702 includes the client ID 601, the send ID 602, and compressed data (compressed job log) 710 of the job log. The compressed data 710 is data into which the log ID 603 and the job log content 604 are compressed. The compressed job log transmitted from the client is received by the request acceptance unit, is temporarily stored in the compressed data temporary storage unit, is retrieved by the backend processing unit, and is registered as the job log. The compressed data temporary storage unit 702 corresponds to the compressed data temporary storage unit 803 illustrated in FIGS. 8 and 12 which will be described below.

Whether registration of a job log transmitted from a client has succeeded or failed is registered in a registration information storage unit 703. The registration information storage unit 703 includes the columns of the client ID 601, the send ID 602, the log ID 603, and a state 711.

The state 711 is set to indicate a progress status of jog log registration. The progress status of job log registration is managed as any of "ENTRY", "TRUE", and "FALSE". The tem "ENTRY" indicates that the registration is in progress (a period from acceptance of the registration request until completion of the registration processing). The term "TRUE" indicates that the registration has succeeded, and the term "FALSE" indicates that the registration has failed. By referring to the state 711, it can be determined whether the registration has succeeded or failed, or the registration is now in progress, when the client requests acquisition of the result of the job log registration. If the job log registration is now in progress, the client needs to acquire the registration result again to check whether the registration has succeeded or failed.

[Configuration of Interfaces to be Implemented in a Service According to Exemplary Embodiments]

A configuration of interfaces to be implemented in a service according to a first exemplary embodiment will be described with reference to FIG. 8. The present exemplary embodiment will be described, assuming that a transmission source of a job log is the job log collection server 103. The processing flow is the same, even if the job log collection server 103 is replaced with the image forming apparatus 104.

FIG. 8 illustrates the configuration of interfaces to be implemented in the service according to the first exemplary embodiment. As illustrated in FIG. 8, in the present exemplary embodiment, the server computer group 102 includes the registration request acceptance unit 801 and the registration confirmation request acceptance unit 809 at the front end. Further, the server computer group 102 includes the registration processing unit 805 and the registration confirmation processing unit 808 at the back end. The storage of the server computer group 102 includes the first execution command data storage unit 802, the second execution command data storage unit 806, the compressed data temporary storage unit 803, the job log storage unit 804, and the registration information storage unit 807.

The registration request acceptance unit 801 receives a compressed job log from the job log collection server 103, registers the received job log with the compressed data temporary storage unit 803, and registers a message with the first execution command data storage unit 802. The compressed data temporary storage unit 803 is a storage for temporarily storing a compressed job log transmitted from the job log collection server 103. The first execution command data storage unit 802 is a storage for storing a message of the queue from the registration request acceptance unit 801.

The registration processing unit 805 acquires the message from the first execution command data storage unit 802, and acquires the compressed job log based on the acquired message. Further, the registration processing unit 805 decompresses the acquired compressed job log, registers the decompressed job log with the job log storage unit 804, and registers a message to the registration confirmation processing unit 808 with the second execution command data storage unit 806. The job log storage unit 804 is a storage with which the job log decompressed by the registration processing unit 805 is registered. The second execution command data storage unit 806 is a storage for storing the message of the queue from the registration processing unit 805.

The registration confirmation processing unit 808 acquires a message from the second execution command data storage unit 806, and registers a result of job log registration with the registration information storage unit 807. The registration information storage unit 807 is a storage in which the result of job log registration is stored by the registration confirmation processing unit 808. The registration confirmation request acceptance unit 809 acquires the result of job log registration from the registration information storage unit 807, and returns the result to the job log collection server 103.

Figure 9B:
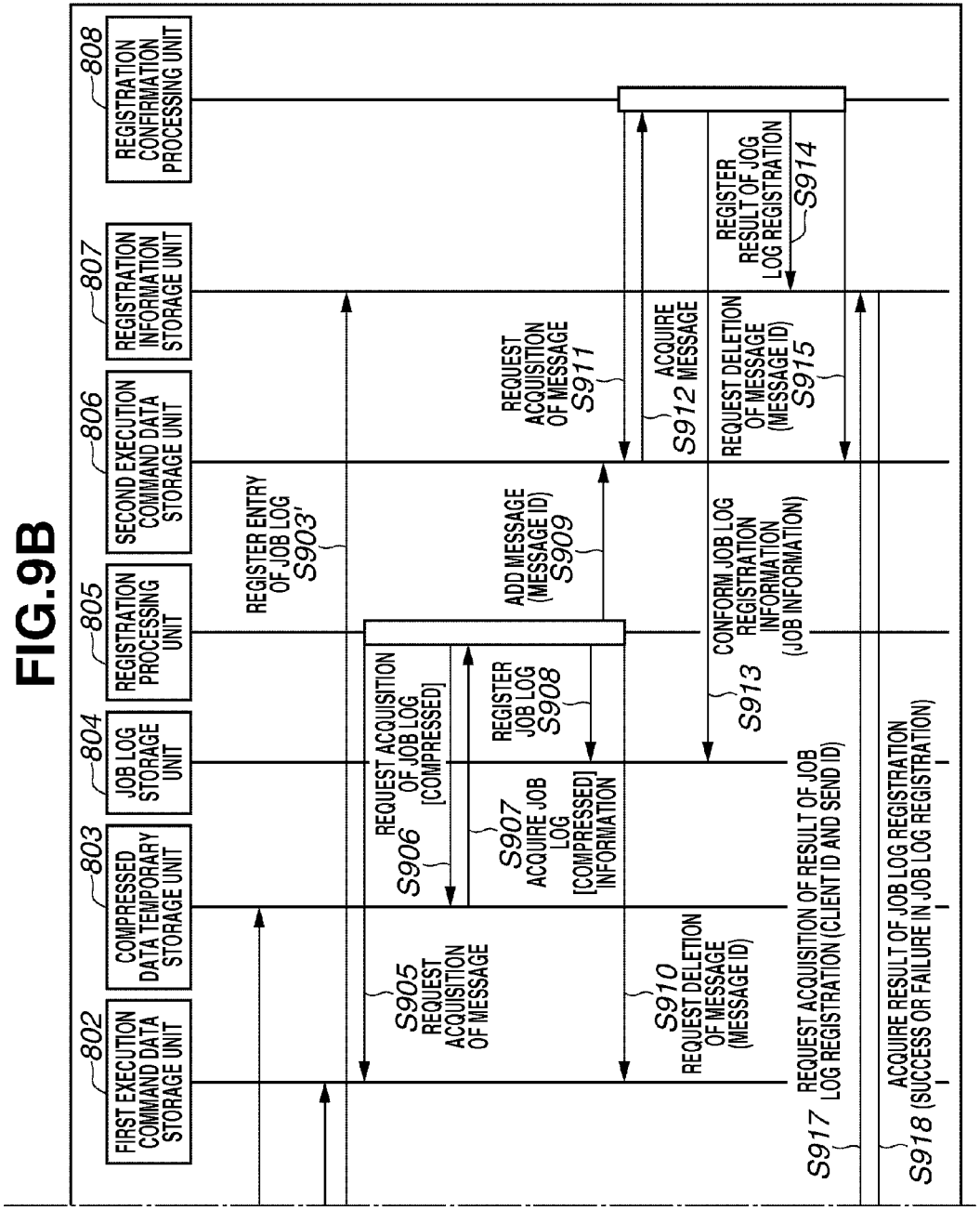
FIG. 9 (including FIG. 9A and FIG. 9B) is a sequence diagram illustrating an example of a processing flow in a job log registration system according to the first exemplary embodiment.

In the following, a processing flow in the configuration illustrated in FIG. 8 will be described with reference to a sequence diagram in FIG. 9. FIG. 9 is the sequence diagram illustrating an example of the processing flow in the job log registration system according to the first exemplary embodiment. In step S901, the registration request acceptance unit 801 receives a request for job log registration (including a compressed job log) from the job log collection server 103. In step S902, the registration request acceptance unit 801 registers the compressed job log received from the job log collection server 103 with the compressed data temporary storage unit 803.

Then, in step S903, the registration request acceptance unit 801 adds a message to the first execution command data storage unit 802 (registration command storage unit). This message is execution command data for processing the above-described received registration request, and includes the client ID 601 and the send ID 602 of the above-described received registration request.

In step S904, the registration request acceptance unit 801 notifies the job log collection server 103 that the registration acceptance has been normally completed (notification of information indicating the send ID and a success in the acceptance). If the registration of the compressed job log has failed, the registration request acceptance unit 801 notifies the job log collection server 103 that the registration acceptance has been abnormally ended (notification of information indicating the send ID and a failure in the acceptance), instead of notification of normal completion of the registration acceptance in step S904.

After step S903, in step S903', the registration request acceptance unit 801 registers the registration information corresponding to the received request for the job log registration with the registration information storage unit 807. In this case, "ENTRY" is registered in the state 711, and the term "NULL" is registered in the log ID 603.

The registration processing unit 805 monitors the first execution command data storage unit 802. In step S905, when the message is added in the first execution command data storage unit 802, the registration processing unit 805 acquires the message by issuing a request for acquisition of the message to the first execution command data storage unit 802.

In step S906, upon receiving the message, the registration processing unit 805 issues a request for acquisition of the compressed job log to the compressed data temporary storage unit 803, based on the acquired first message. In step S907, the registration processing unit 805 acquires the compressed job log from the compressed data temporary storage unit 803.

Then, in step S908, the registration processing unit 805 decompresses the acquired compressed job log, and registers the decompressed job log with the job log storage unit 804. After the registration of the job log, in step S909, the registration processing unit 805 adds a message to the second execution command data storage unit 806 (confirmation command storage unit). This second message is execution command data for confirming the registration of the above-described registered job log, and includes the client ID 601 and the send ID 602 of the above-described registered job log.

After the addition of the second message to the second execution command data storage unit 806, in step S910, the registration processing unit 805 issues a request for deletion of the first message to the first execution command data storage unit 802 to delete the processed first message in the first execution command data storage unit 802.

If the decompression of the compressed job log has failed, the registration processing unit 805 sets "FALSE" into the state 711, and updates the log ID 603 to the log ID of the above-described compressed job log in the registration information in the registration information storage unit 807, which corresponds to the client ID 601 and the send ID 602 of the job log that has failed to be decompressed, instead of performing the processing from the above-described step S908 to step S910.

The registration confirmation processing unit 808 monitors the second execution command data storage unit 806. In step S911, when the second message is added at step S909 in the second execution command data storage unit 806, the registration confirmation processing unit 808 issues a request for acquisition of the second message to the second execution command data storage unit 806. In step S912, the registration confirmation processing unit 808 acquires the second message.

In step S913, upon receiving the message, the registration confirmation processing unit 808 confirms whether the job log corresponding to the acquired message is registered in the job log storage unit 804. If the corresponding job log is registered, the registration confirmation processing unit 808 acquires the log ID 603 of the job log. In step S914, the registration confirmation processing unit 808 registers the log ID 603 of the acquired registered job log with the registration information storage unit 807. More specifically, the registration confirmation processing unit 808 sets "TRUE" into the state 711 and updates the log ID 603 to the log ID of the above-described acquired registered job log in the registration information in the registration information storage unit 807, which corresponds to the client ID 601 and the send ID 602 of the job log that the registration confirmation processing unit 808 has confirmed to be registered.

In step S915, the registration confirmation processing unit 808 issues a request for deletion of the message to the second execution command data storage unit 806 to delete the processed message in the second execution command data storage unit 806. As a result of the confirmation processing in the step S913, if the job log registration has failed, the registration confirmation processing unit 808 updates the state 711 to "FALSE" in the registration information in the registration information storage unit 807, which corresponds to the client ID 601 and the send ID 602 of the job log that the registration confirmation processing unit 808 has confirmed as a failure.

In step S916, the registration confirmation request acceptance unit 809 receives a request for confirmation of the job log registration (including the client ID 601 and the send ID 602) from the job log collection server 103. Then, in step S917, the registration confirmation request acceptance unit 809 issues a request for acquisition of the result of the job log registration to the registration information storage unit 807.

Then, in step S918, the registration confirmation request acceptance unit 809 acquires the result of the job log registration from the registration information storage unit 807. In step S919, the registration confirmation request acceptance unit 809 notifies the job log collection server 103 of the registration result (including the client ID 601, the send ID 602, and the state 711).

Figure 10:
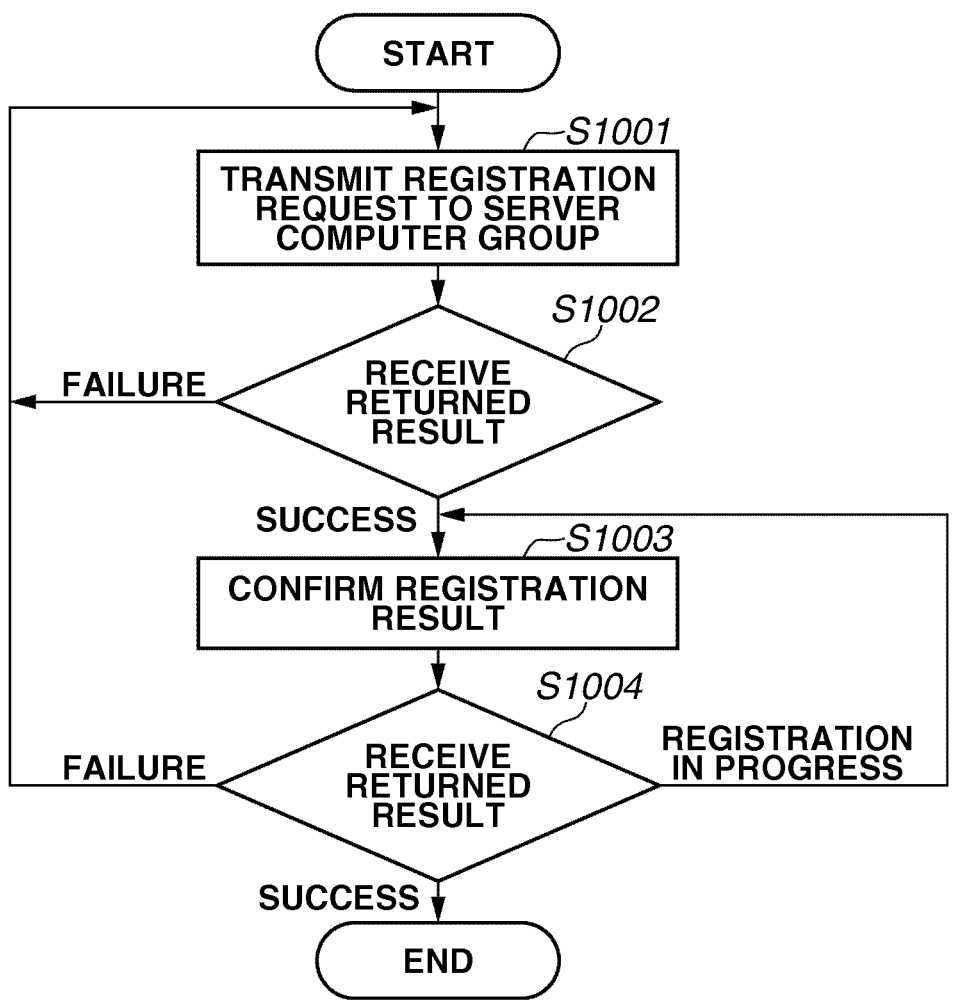
FIG. 10 is a flowchart illustrating an example of job log registration processing performed by a job log collection server according to the first exemplary embodiment.

FIG. 10 is a flowchart illustrating an example of the job log registration processing performed by the job log collection server 103 according to the first exemplary embodiment. This processing corresponds to the processing from transmission of a compressed job log from the job log collection server 103 to the server computer group 102 until completion of the registration including a recovery operation. The program stored in the ROM 202 or the HD 211 of the information processing apparatus (FIG. 2) constituting the job log collection server 103 is loaded to the RAM 203 and is executed by the CPU 201, thereby realizing the processing of the flowchart in FIG. 10.

In step S1001, the job log collection server 103 transmits a registration request to the registration request acceptance unit 801 of the server computer group 102 with use of the job log transmission unit 406 (registration request transmission processing). At this time, the job log collection server 103 transmits the client ID 601, the send ID 602, and the compressed job log to the registration request acceptance unit 801 as a request for job log registration to the server computer group 102.

Then, in step S1002, the job log collection server 103 determines whether the request for the job log registration has been successfully accepted or has failed to be accepted based on the returned result from the registration request acceptance unit 801. If the job log collection server 103 determines based on the returned result that the request for the job log registration has failed to be accepted (FAILURE in step S1002), the job log collection server 103 returns to step S1001 and transmits a request for the job log registration to the server computer group 102 again.

On the other hand, if the job log collection server 103 determines based on the returned result from the registration request acceptance unit 801 that the request for the job log registration has been successfully accepted (SUCCESS in step S1002), the job log collection server 103 advances the processing to step S1003.

In step S1003, the job log collection server 103 requests the result of the job log registration to the registration confirmation request acceptance unit 809 of the server computer group 102 with use of the registration information communication unit 407 (registration result confirmation processing). More specifically, the job log collection server 103 transmits to the registration confirmation request acceptance unit 809, the information of the client ID 601 and sends ID 602 of the job log requested to be registered as a request for the result of the job log registration. Then the job log collection server 103 receives the confirmation result indicating whether the job log requested to be registered has been successfully registered, has failed to be registered, or is currently being registered.

Then, in step S1004, the job log collection server 103 determines the returned result. If it is determined that the job log is currently being registered (ENTRY) (REGISTRATION IN PROGRESS in step S1004), the processing proceeds to step S1003 in which the job log collection server 103 tries to confirm the result of the registration again after a certain time has passed, because the registration processing is still in progress.

If it is determined that the registration has failed (FALSE) (FAILURE in step S1004), the job log collection server 103 returns to step S1001 and repeats the processing from the transmission of the registration request. If it is determined that the registration has succeeded (TRUE) (SUCCESS in step S1004), the job log collection server 103 ends the job log registration processing.

Figure 11:
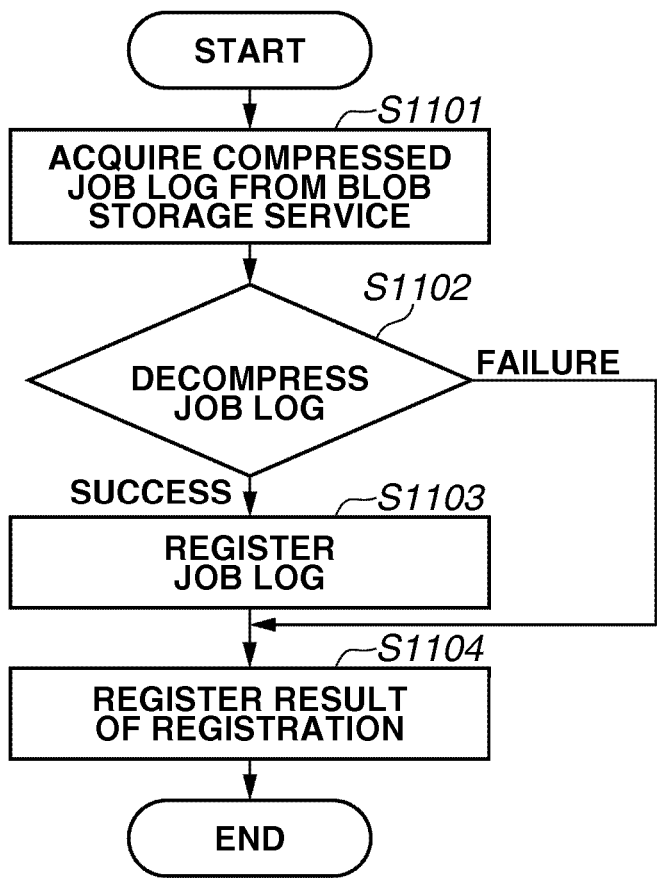
FIG. 11 is a flowchart illustrating an example of job log registration processing performed by a server computer group according to the first exemplary embodiment.

FIG. 11 is a flowchart illustrating an example of the job log registration processing performed by the server computer group 102 according to the first exemplary embodiment. The flowchart illustrates processing from acquisition of a compressed job log by the registration processing unit 805 of the server computer group 102 from the compressed data temporary storage unit 803 until registration of the job log by the registration processing unit 805. The processing of the flowchart is performed by the registration processing unit 805 and the registration confirmation processing unit 808 of the server computer group 102. In other words, the program stored in the ROM 202 or the HD 211 of the information processing apparatus (FIG. 2) constituting the server computer group 102 is loaded to the RAM. 203 and is executed by the CPU 201, thereby realizing this processing.

In step S1101, the registration processing unit 805 of the server computer group 102 acquires a message from the first execution command data storage unit 802, and acquires a compressed job log from the compressed data temporary storage unit 803 (blob storage service) based on the information of the message.

Then, in step S1102, the registration processing unit 805 decompresses the compressed job log. If the registration processing unit 805 succeeds in decompressing the compressed job log(SUCCESS in step S1102), in step S1103, the registration processing unit 805 registers the job log with the job log storage unit 804, and adds a message to the second execution command data storage unit 806.

In step S1104, after receiving the message from the second execution command data storage unit 806, the registration confirmation processing unit 808 confirms the result by referring to the job log storage unit 804. If the registration has succeeded, the registration confirmation processing unit 808 registers a success (TRUE) with the registration information storage unit 807. If the registration has failed, the registration confirmation processing unit 808 registers a failure (FALSE) with the registration information storage unit 807.

On the other hand, if the registration processing unit 805 has failed in decompressing the job log(FAILURE in step S1102), in step S1104, the registration processing unit 805 registers a failure (FALSE) with the registration information storage unit 807.

According to the present exemplary embodiment, the processing time of one instance can be reduced due to asynchronous registration of various kinds of logs including a job log, so that one instance can receive requests from a larger number of clients. As a result, it is possible to reduce the number of instances to be prepared in advance, and reduce the total operating time of instances, leading to a reduction in the operational cost.

According to the above-described first exemplary embodiment, registering a log by asynchronous processing allows the server computer group 102 to process an acceptance of a request from one client in a short time, so that the server computer group 102 can accept requests from many clients with use of a reduced number of instances.

However, the configuration according to the first exemplary embodiment still has an issue that a generous number of instances needs to be prepared to maintain a stable operation in response to access from clients, and arranging the processing to be performed asynchronously results in necessity of an additional instance in charge of confirmation processing.

A second exemplary embodiment is characterized in that recovery of log registration is performed during next registration, and an instance is generated according to a request from a client and the generated instance is deleted once the log registration is finished.

The present exemplary embodiment performs recovery of log registration when a next request is issued from a client, and therefore there is no need to access the server computer group 102 several times for recovery. Further, the present exemplary embodiment generates an instance required for log registration after receiving a request from a client, and therefore the number of instances to be prepared can be reduced to a minimum required number, leading to a reduction in the total operating time of instances and a reduction in the operational cost. In the following, the present exemplary embodiment will be described based on an example of registering a job log in the network system, but a log registered in the network system is not limited to a job log, and may be any kind of log.

Figure 12:
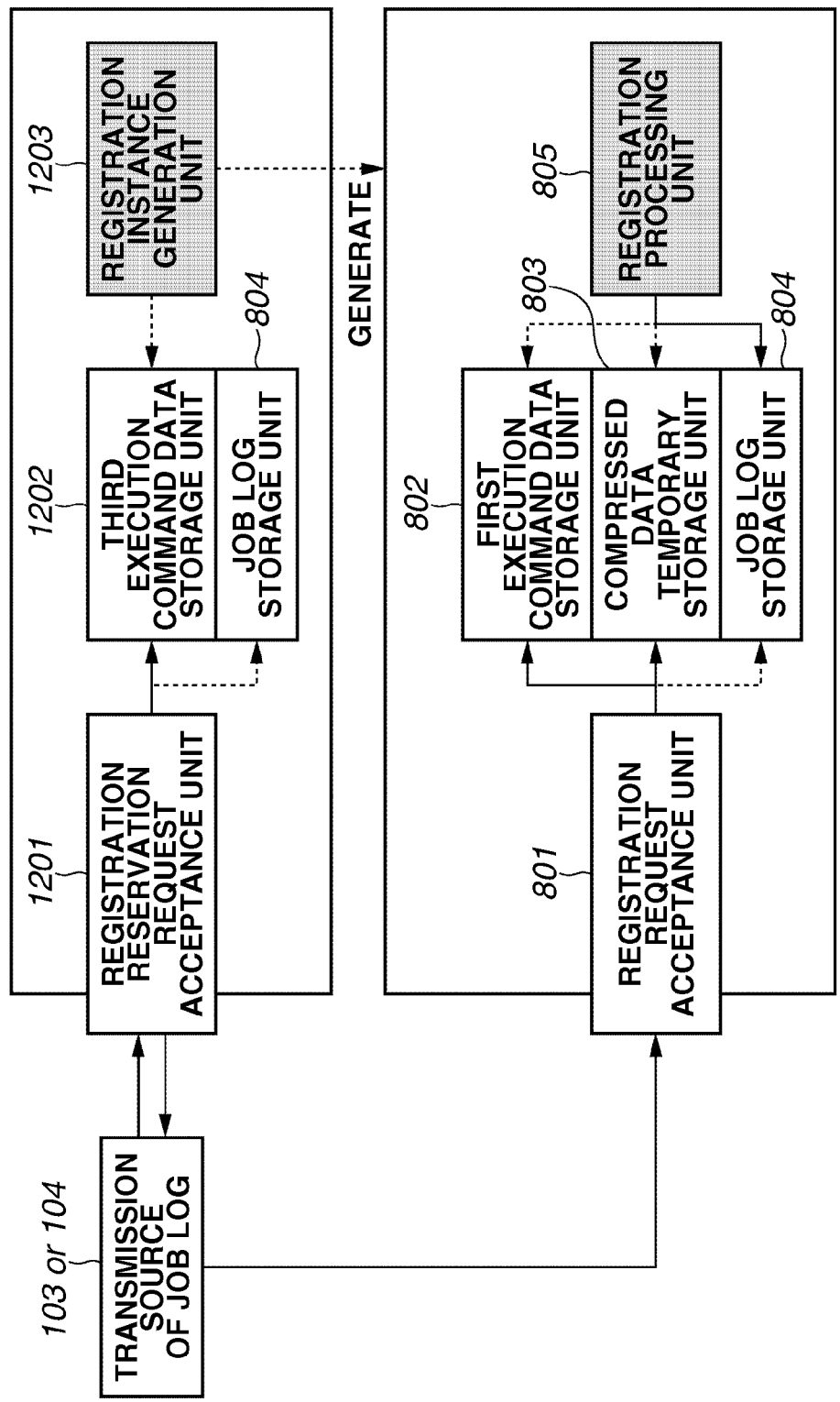
FIG. 12 illustrates a configuration of interfaces that are implemented in a service according to a second exemplary embodiment.

In the following, the second exemplary embodiment will be described in detail. The configurations in the second exemplary embodiment corresponding to the configurations illustrated in FIGS. 1 to 7 are similar to those of the first exemplary embodiment. However, referring to FIG. 4, the job log collection server 103 in the second exemplary embodiment does not include the registration information communication unit 407. Similarly, the image forming apparatus 104 does not include the registration information communication unit 409. FIG. 12 illustrates a configuration of interfaces to be implemented in a service according to the second exemplary embodiment, and the same units are indicated by the same reference numbers as those in FIG. 8.

The server computer group 102 according to the second exemplary embodiment includes a registration reservation request acceptance unit 1021 and the registration request acceptance unit 801 at the front end. Further, the server computer group 102 according to the second exemplary embodiment includes a registration instance generation unit 1203 and the registration processing unit 805 at the back end. Furthermore, the storage of the server computer group 102 according to the second exemplary embodiment includes a third execution command data storage unit 1202, the first execution command data storage unit 802, the compressed data temporary storage unit 803, and the job log storage unit 804.

Upon receiving a request for a reservation of job log registration from the job log collection server 103, the registration reservation request acceptance unit 1201 acquires the log ID 603 of the job log that was registered last from the client requesting the reservation of the job log registration with the job log storage unit 804, and returns the log ID 603 to the job log collection server 103. Then, the registration reservation request acceptance unit 1201 registers a message requesting generation of the registration request acceptance unit 801 and the registration processing unit 805 with the third execution command data storage unit 1202. The third execution command data storage unit 1202 is a storage for storing a message of a queue from the registration reservation request acceptance unit 1201.

The registration instance generation unit 1203 acquires the message from the third execution command data storage unit 1202, and generates the registration request acceptance unit 801 and the registration processing unit 805. In other words, the registration request acceptance unit 801 and the registration processing unit 805 each are an instance generated (embodied as a virtual computer in the server computer group 102) by the registration instance generation unit 1203 when necessary.

The registration request acceptance unit 801 receives a compressed job log from the job log collection server 103, registers the compressed job log with the compressed data temporary storage unit 803, and registers a message with the first execution command data storage unit 802. The compressed data temporary storage unit 803 is a storage for temporarily storing a compressed job log transmitted from the job log collection server 103. The first execution command data storage unit 802 is a storage for storing a message of the queue from the registration request acceptance unit 801.

The registration processing unit 805 acquires the message from the first execution command data storage unit 802, and acquires the compressed job log based on the acquired message. Further, the registration processing unit 805 decompresses the acquired compressed job log, and registers the decompressed job log with the job log storage unit 804. The job log storage unit 804 is a storage with which the job log decompressed by the registration processing unit 805 is registered.

Figure 13B:
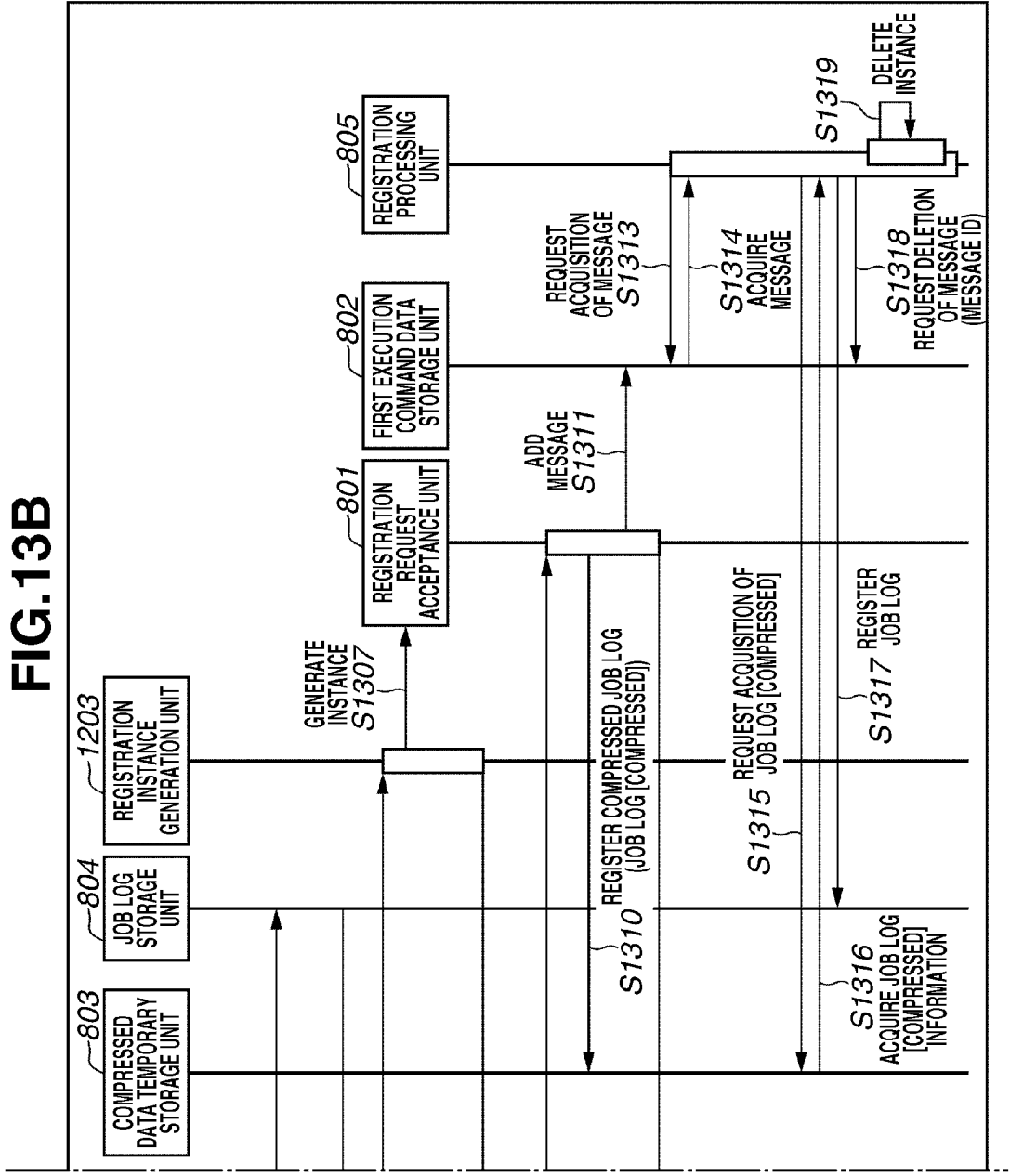
FIG. 13 (including FIG. 13A and FIG. 13B) is a sequence diagram illustrating an example of a processing flow in a job log registration system according to the second exemplary embodiment.

In the following, a processing flow in the configuration illustrated in FIG. 12 will be described with reference to a sequence diagram of FIG. 13 (including FIGS. 13A and 13B). FIGS. 13A and 13B are the sequence diagram illustrating an example of the processing flow in the job log registration system according to the second exemplary embodiment.

In step S1301, the registration reservation request acceptance unit 1201 receives a request for a reservation of job log registration from the job log collection server 103. In step S1302, the registration reservation request acceptance unit 1201 requests acquisition of the log ID 603 of the job log that was registered last from the client requesting the reservation of the job log registration with the job log storage unit 804. Then, in step S1303, the registration reservation request acceptance unit 1201 acquires the log ID 603 of the job log registered last from the client requesting the reservation of the job log registration.

Then, in step S1304, the registration reservation request acceptance unit 1201 adds a message to the third execution command data storage unit 1202 (generation command storage unit). In step S1305, the registration reservation request acceptance unit 1201 notifies the job log collection server 103 that the acceptance of the reservation of the job log registration has been normally completed. The message added in step S1304 is execution command data for generation of the registration request acceptance unit 801 and the registration processing unit 805.

The registration instance generation unit 1203 monitors the third execution command data storage unit 1202. In step S1306, when the message is added to the third execution command data storage unit 1202, the registration instance generation unit 1203 requests acquisition of the message to the third execution command data storage unit 1202 to acquire the message.

In step S1307, upon receiving the message, the registration instance generation unit 1203 generates the registration request acceptance unit 801 and the registration processing unit 805 based on the acquired message. In step S1308, after completion of the generation of the registration request acceptance unit 801 and the registration processing unit 805, the registration instance generation unit 1203 issues a request for deletion of the message to the third execution command data storage unit 1202 to delete the processed message in the third execution command data storage unit 1202.

In step S1309, the registration request acceptance unit 801 generated by the registration instance generation unit 1203 receives a request for the job log registration (including a compressed job log) from the job log collection server 103. In step S1310, the registration request acceptance unit 801 registers the compressed job log received from the job log collection server 103 with the compressed data temporary storage unit 803.

In step S1311, the registration request acceptance unit 801 adds a message to the first execution command data storage unit 802 (registration command storage unit). This message is execution command data for processing the above-described received registration request, and includes the client ID 601 and the send ID 602 of the above-described received registration request.

Further, in step S1312, the registration request acceptance unit 801 notifies the job log collection server 103 that the acceptance of the registration has been normally completed (notification of information indicating the send ID 602 and a success in the acceptance). If the registration of the compressed job log has failed, the registration request acceptance unit 801 notifies the job log collection server 103 that the acceptance of the registration has been abnormally ended (notification of information indicating the send ID 602 and a failure in the acceptance) to the job log collection server 103, instead of notifying the job log collection server 103 that the acceptance of the registration has been normally completed in the above-described step S1312.

The registration processing unit 805 monitors the first execution command data storage unit 802. In step S1313, when the message is added to the first execution command data storage unit 802, the registration processing unit 805 issues a request for acquisition of the message to the first execution command data storage unit 802. Then, in step S1314, the registration processing unit 805 acquires the message.

In step S1315, upon receiving the message, the registration processing unit 805 issues a request for acquisition of the compressed job log to the compressed data temporary storage unit 803 based on the acquired message. In step S1316, the registration processing unit 805 acquires the compressed job log from the compressed data temporary storage unit 803.

Then, in step S1317, the registration processing unit 805 decompresses the acquired compressed job log, and registers the decompressed job log with the job log storage unit 804. In step S1318, after completion of the job log registration, the registration processing unit 805 issues a request for deletion of the message to the first execution command data storage unit 802 to delete the processed message in the first execution command data storage unit 802.

In step S1319, after the deletion of the message in the first execution command data storage unit 802, the registration processing unit 805 deletes the used instances (the registration request acceptance unit 801 and the registration processing unit 805).

Figure 14:
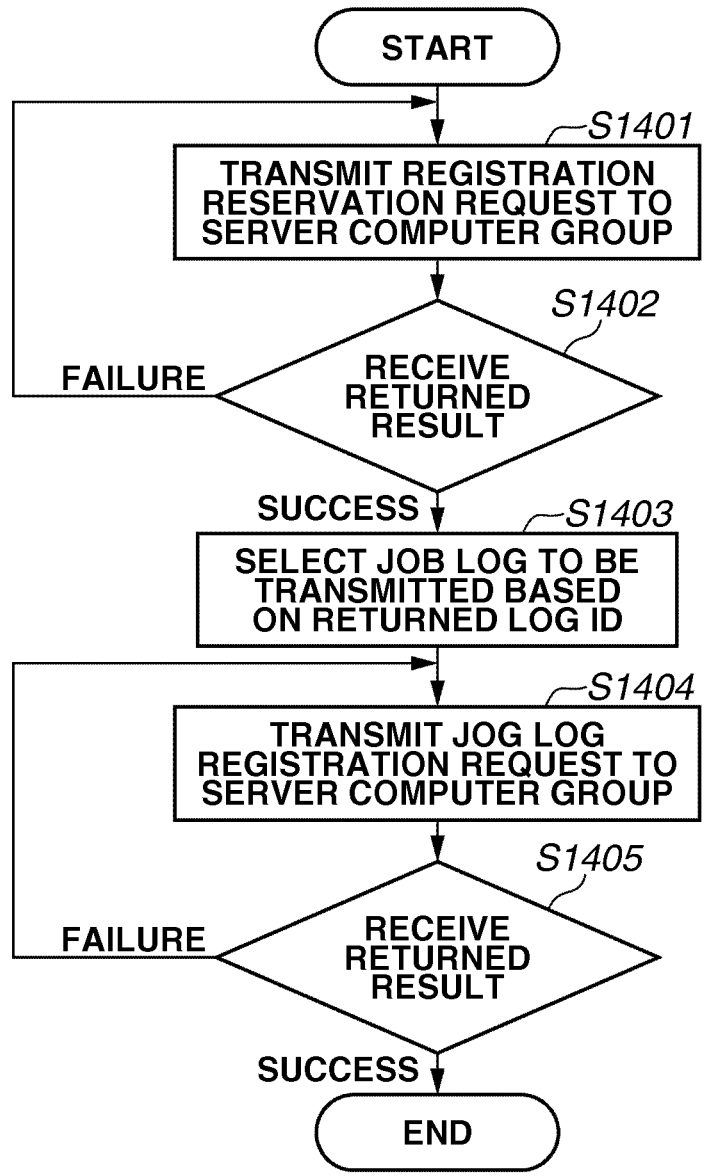
FIG. 14 is a flowchart illustrating an example of job log registration processing performed by a job log collection server according to the second exemplary embodiment.

FIG. 14 is a flowchart illustrating an example of the job log registration processing performed by the job log collection server 103 according to the second exemplary embodiment. This processing corresponds to the processing from issuance of a request for a reservation of job log registration by the job log collection server 103 to the server computer group 102 until completion of transmission of a compressed job log by the job log collection server 103. The program stored in the ROM 202 or the HD 211 of the information processing apparatus (FIG. 2) constituting the job log collection server 103 is loaded to the RAM 203 and is executed by the CPU 201, thereby realizing the processing of the flowchart in FIG. 14.

In step S1401, the job log collection server 103 transmits a request for a reservation of job log registration to the registration reservation request acceptance unit 1201 of the server computer group 102 (registration reservation request transmission processing). A request for a reservation of job log registration is to request the registration reservation request acceptance unit 1201 to accept a reservation of registering a job log that is collected from an image forming apparatus communicable via the network 100 and is stored in the jog log collection server 103.

If the reservation of the job log registration has been successfully accepted, the server computer group 102 returns the information of the log ID 603 of the job log registered last from this job log collection server 103, as a notification indicating that the acceptance of the reservation the of registration has been normally completed. On the other hand, if the reservation of the job log registration has failed to be accepted, the server computer group 102 returns a notification indicating that the acceptance of the reservation of the registration has been abnormally ended.

Then, in step S1402, the job log collection server 103 determines whether the acceptance of the reservation of the job log registration has succeeded or failed based on the result returned from the registration reservation request acceptance unit 1201. If the registration reservation request acceptance unit 1201 returns a notification indicating that the acceptance of the reservation of the registration has been abnormally ended, and the job log collection server 103 determines that the acceptance of the reservation of the job log registration has failed (FAILURE in S1402), the job log collection server 103 returns to step S1401 and transmits the request for the reservation of the registration to the server computer group 102 again.

On the other hand, if the registration reservation request acceptance unit 1201 returns a notification indicating that the acceptance of the reservation of the registration has been normally completed (the log ID 603), and the job log collection server 103 determines that the acceptance of the reservation of the job log registration has succeeded (SUCCESS in S1402), the processing proceeds to step S1403.

In step S1403, the job log collection server 103 selects a job log to be requested to be registered based on the log ID 603 returned from the registration reservation request acceptance unit 1201. In other words, the job log collection server 103 selects the job log corresponding to the next log ID 603 of the above-described returned log ID 603 as a job log to be requested to be registered. Then, the job log collection server 103 compresses the selected job log.

Then, in step S1404, the job log collection server 103 transmits a request for the registration to the registration request acceptance unit 801 of the server computer group 102 with use of the job log transmission unit 406 (registration request transmission processing). At this time, the job log collection server 103 transmits to the registration request acceptance unit 801, the client ID 601, the send ID 602, and the job log selected and compressed in step S1403 as a request for the job log registration.

Then, in step S1405, the job log collection server 103 receives a result returned from the registration request acceptance unit 801, and determines based on the returned result whether the request for the job log registration has been successfully accepted or failed to be accepted. If it is determined based on the returned result that the request for the job log registration has failed to be accepted (FAILURE in step S1405), in step S1404, the job log collection server 103 transmits the request for the registration to the server computer group 102 again.

On the other hand, if it is determined based on the result returned from the registration request acceptance unit 801 that the request for the job log registration has been successfully accepted (SUCCESS in step S1405), the processing is ended regardless of whether the registration succeeds or fails, since recovery processing is performed at the timing of the next registration reservation request transmission processing.

According to the present exemplary embodiment, recovery of job log registration is performed later (performed when the next reservation is accepted), and therefore instances for registration confirmation (the registration confirmation request acceptance unit 809 and the registration confirmation processing unit 808 in the first exemplary embodiment) are unnecessary.

Further, since an instance is generated according to a request (a request for a reservation of registration) from a client, instances can be used only for a minimum required operating time, thereby reducing the total operating time of instances and reducing the operational cost.

As described above, according to the present exemplary embodiment, it is possible to construct an excellent cloud computing system capable of reducing a total operating time of instances in cloud computing and reducing a operational cost required to register various kinds of logs including a job log.

The configurations and the contents of the above-described various pieces of data are not limited to the described ones, and it should be understood that these pieces of data can have any configurations and contents according to the usage and purpose. Although having described exemplary embodiments, the present invention can be embodied by, for example, a system, an apparatus, a method, a program, or a storage medium. More specifically, the present invention can be applied to a system constituted by a plurality of apparatuses, or an apparatus constituted by one device. Further, any combination of the above-described exemplary embodiments is included in the present invention.

Further, the present invention can be also embodied by performing the following processing, i.e., processing of providing a system or an apparatus with software (program) capable of realizing the functions of the above-described exemplary embodiments through a network or various kinds of storage media, and causing a computer (or, for example, a CPU or a micro processing unit (MPU)) of the system or the apparatus to read out and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-252413 filed Nov. 11, 2010, which is hereby incorporated by reference herein in its entirety.

What is claimed is:

1. A network system comprising:
   a client; and
   a server provided with a storage unit and constituted of a server computer group including one or more server computers communicable to the client, wherein the server includes:
   a notification unit configured to notify, when an acceptance of a request for a reservation of registration of a job log that is transmitted from the client has failed, the client of the failure of the acceptance of the request for the reservation,
   one or a plurality of first acceptance units configured to return, to the client and according to a success of an acceptance of a request for a reservation of registration of a job log that is transmitted from the client, identification information of a job log registered last with the storage unit from a plurality of job logs that has been accepted from the client,
   one or a plurality of second acceptance units configured to accept a request for registration of a job log that is transmitted from the client, to temporarily store the job log in a job log storing storage, and to register execution command data for processing the request for the registration with a registration command storage, and
   one or a plurality of registration processing units configured to acquire the execution command data from the registration command storage and to register the job log stored in the job log storing storage with the storage unit based on the execution command data, wherein the registration of the job log with the storage unit is performed asynchronously with the registration of the execution command data with the registration command storage, wherein the one or the plurality of first acceptance units is configured to return, to the client, the identification information so that a job log for which a recovery of registration processing of the one or the plurality of registration processing units is necessary is retransmitted from the client, and wherein the client includes:

a storing unit configured to store a job log, a first transmission unit configured to transmit, to the server, a request for a reservation of registration of the job log stored in the storing unit, a selection unit configured to select a job log to be requested to be registered from the job log stored in the storing unit based on job log identification information returned in response to the success of the request for the reservation of the registration, and a second transmission unit configured to transmit a request for registration and the job log selected by the selection unit to the server, wherein the first transmission unit is configured to transmit, to the server, the request for the reservation of the registration again when a notification of the failure of the acceptance of the request for the reservation of the registration is received from the server.

2. A server provided with a storage unit and constituted of a server computer group including one or more server computers communicable to a client, the server comprising:

a notification unit configured to notify, when an acceptance of a request for a reservation of registration of a job log that is transmitted from the client has failed, the client of the failure of the acceptance of the request for the reservation;

one or a plurality of first acceptance units configured to return, to the client and according to a success of an acceptance of a request for a reservation of registration of a job log that is transmitted from the client, identification information of a job log registered last with the storage unit from a plurality of job logs that has been accepted from the client;

one or a plurality of second acceptance units configured to accept a request for registration of a job log that is transmitted from the client, to temporarily store the job log in a job log storing storage, and to register execution command data for processing the request for the registration with a registration command storage; and one or a plurality of registration processing units configured to acquire the execution command data from the registration command storage and to register the job log stored in the job log storing storage with the storage unit based on the execution command data, wherein the registration of the job log with the storage unit is performed asynchronously with the registration of the execution command data with the registration command storage, wherein the one or the plurality of first acceptance units is configured to return, to the client, the identification information so that a job log for which a recovery of registration processing of the one or the plurality of registration processing units is necessary is retransmitted from the client.

3. The server according to claim 2, wherein each of the second acceptance units and the registration processing units is an instance materialized as a virtual computer in the server computer group.

4. The server according to claim 2, wherein the one or the plurality of first acceptance units accepts the request for the reservation of the registration of the job log that is transmitted from the client, and registers execution command data for generating the one or the plurality of second acceptance units and the one or the plurality of registration processing units with a generation command storage.

5. The server according to claim 4, further comprising a generation unit configured to acquire the execution command data from the generation command storage and to generate the one or the plurality of second acceptance units and the one or the plurality of registration processing units, asynchronously with the registration of the execution command data with the generation command storage.

6. The server according to claim 2, wherein the one or the plurality of registration processing units deletes the one or the plurality of second acceptance units and the one or the plurality of registration processing units itself after the registration of the job log with the storage unit.

7. The server according to claim 2, wherein the job log that the one or the plurality of second acceptance units receives from the client is a compressed job log, and wherein the one or the plurality of registration processing units decompresses the compressed job log stored in the job log storing storage, and registers the decompressed job log with the storage unit.

8. A method for a server provided with a storage unit and constituted of a server computer group including one or more server computers communicable to a client, the method comprising:

notifying, when an acceptance of a request for a reservation of registration of a job log that is transmitted from the client has failed, the client of the failure of the acceptance of the request for the reservation;

returning, to the client and according to a success of an acceptance of a request for a reservation of registration of a job log that is transmitted from the client, identification information of a job log registered last with the storage unit from a plurality of job logs that has been accepted from the client;

accepting a request for registration of a job log that is transmitted from the client, temporarily storing the job log in a job log storing storage, and registering execution command data for processing the request for the registration with a registration command storage; and acquiring the execution command data from the registration command storage and registering the job log stored in the job log storing storage with the storage unit based on the execution command data, wherein the registration of the job log with the storage unit is performed asynchronously with the registration of the execution command data with the registration command storage, wherein returning includes returning, to the client, the identification information so that a job log for which a recovery of registration processing is necessary is retransmitted from the client.

9. A non-transitory computer readable medium storing a program to cause a server provided with a storage unit and constituted of a server computer group including one or more server computers communicable to a client to perform a method, the method comprising:

notifying, when an acceptance of a request for a reservation of registration of a job log that is transmitted from the client has failed, the client of the failure of the acceptance of the request for the reservation;

returning, to the client and according to a success of an acceptance of a request for a reservation of registration of a job log that is transmitted from the client, identification information of a job log registered last with the storage unit from a plurality of job logs that has been accepted from the client;

accepting a request for registration of a job log that is transmitted from the client, temporarily storing the job log in a job log storing storage, and registering execution command data for processing the request for the registration with a registration command storage; and acquiring the execution command data from the registration command storage and registering the job log stored in the job log storing storage with the storage unit based on the execution command data, wherein the registration of the job log with the storage unit is performed asynchronously with the registration of the execution command data with the registration command storage, wherein returning includes returning, to the client, the identification information so that a job log for which a recovery of registration processing is necessary is retransmitted from the client.

* * * * *